No. 867,307.
PATENTED OCT. 1, 1907.
L. W. SCOTT.
MUFF HOLDER.
APPLICATION FILED FEB. 8, 1907.
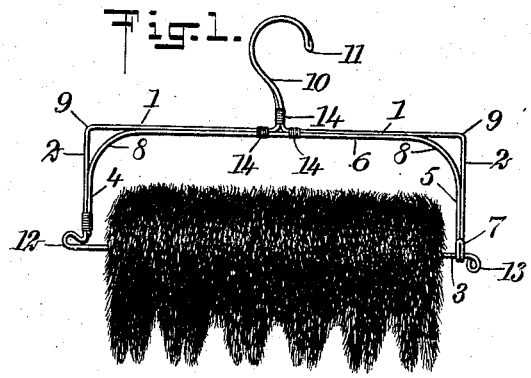
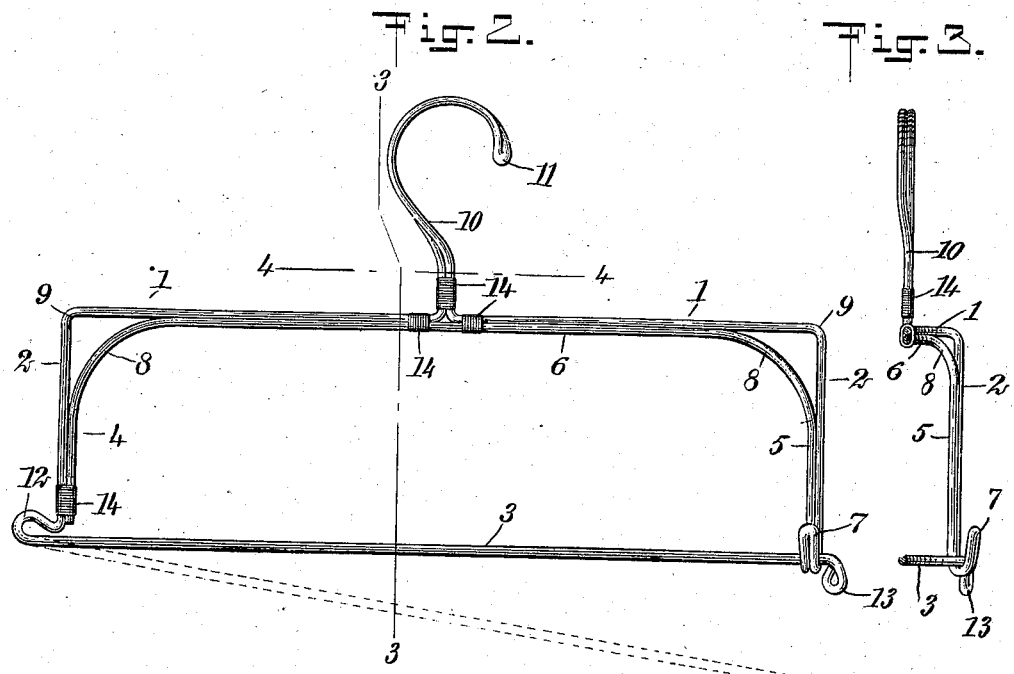
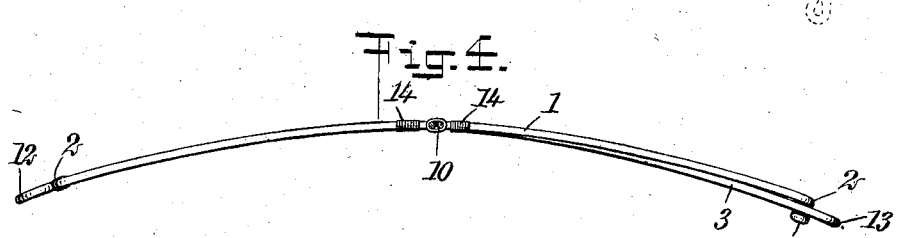
WITNESSES
INVENTOR
Lucius W. Scott
BY
ATTORNEYS

UNITED STATES PATENT OFFICE.

LUCIUS WALTER SCOTT, OF BOSTON, MASSACHUSETTS.

MUFF-HOLDER.

No. 867,307.  Specification of Letters Patent.  Patented Oct. 1, 1907.

Application filed February 8, 1907. Serial No. 356,361.

*To all whom it may concern:*

Be it known that I, LUCIUS W. SCOTT, a citizen of the United States, and a resident of Boston, in the county of Suffolk and State of Massachusetts, have invented a new and Improved Muff-Holder, of which the following is a full, clear, and exact description.

This invention has for its object to provide means simple in construction, effective in operation and durable in use, adapted to support a muff, or other article of apparel when not in use.

Such objects I accomplish by the means illustrated in the accompanying drawings, in which drawings like characters of reference indicate like parts throughout the views, and in which Figure 1 is a side elevation of a device embodying my invention having a muff mounted thereon; Fig. 2 is a side elevation of the device shown in Fig. 1; Fig. 3 is a vertical section taken on the line 3—3 of Fig. 2; and Fig. 4 is a plan of the device shown in Fig. 2, parts being in section on the line 4—4 in said figure.

As illustrated in the drawings, the frame of the holder is comprised of a longitudinal bar 1 having end bars 2 extending therefrom, and a supporting bar 3 fixedly connected to one of the end bars and adapted to be detachably secured to the end of the opposite bar. The holder is preferably made of a single piece of wire, as shown in Fig. 2, by forming one end of the wire into a reinforcing bow having end bars 4 and 5, and a longitudinal bar 6, the end bar 5 and the adjacent end bar 2 being bent to form a loop 7 acting as a keeper to hold the free end of the supporting bar 3. The reinforcing bow is preferably made with curved corners 8 while the main frame of the hanger may be made with angular bends 9, if desired. A hook 10 is formed in the longitudinal bar 1 of the frame, preferably by doubling and bending a portion of the wire so as to form a hook of double wire with a rounded extremity 11, thereby avoiding a rough or raw edge on the end of the hook. A loop 12 is preferably formed on one end of the frame integral with the supporting bar 3, and the opposite end 13 of said supporting bar is preferably turned into a loop thereby forming an enlarged end on the supporting bar having a smooth extremity, adapted to be inserted in the interior of a muff without danger of tearing the lining thereof. The holder is preferably made of resilient wire, and the loop 12 so formed as to enable the supporting wire 3 to assume the position indicated by the dotted lines in Fig. 2, when released from engagement with the loop or keeper 7 of the frame, thereby enabling the muff to be readily removed from the holder. By means of such construction, moreover, when the end of the supporting bar is in engagement with the loop of the frame the spring tension of the bar causes the end thereof to bear firmly in the loop and prevent the supporting bar from being readily removed therefrom. The longitudinal bar of the frame may, if desired, extend in a straight line, but for most purposes I prefer to curve said bar and the supporting bar 3, as shown in Fig. 4, thereby enabling the holder to support the muff when curved longitudinally. While the wire sections forming the longitudinal bar, the hook and one of the end bars may be secured together by means of solder or other material, I prefer to use windings of wire 14 which secure such parts neatly and firmly together, and are adapted to be used in connection with solder or other cementing material, if desired.

Having thus described my invention, what I claim as new and desire to secure by Letters Patent is:

1. A muff holder comprising a double longitudinal bar having double end bars extending outward therefrom, and a double hook arranged centrally in said longitudinal bar, a double hook formed on one of the double end bars, and a single supporting bar having a free end adapted to engage said hook of the end bars, all formed of a single piece of metal, substantially as shown and described.

2. A muff holder comprising a frame having a double longitudinal bar, a double hook located centrally of said bars, double end bars extending outward from the longitudinal bars, a double hook formed on one of the end bars, a single supporting bar having its free end adapted to engage the hook of the end bar, and wire windings securing together the sections forming one of the end bars, the longitudinal bar, and the hook of the longitudinal bar, substantially as shown and described.

In testimony whereof I have signed my name to this specification in the presence of two subscribing witnesses.

LUCIUS WALTER SCOTT.

Witnesses:
THOMAS F. MURPHY,
EDW. H. ZIEGLER.